Dec. 13, 1955 E. D. BRASSEUR 2,727,098

DRIVING MECHANISM FOR MAGNETIC RECORDER

Filed Oct. 26, 1954 3 Sheets-Sheet 1

Dec. 13, 1955 E. D. BRASSEUR 2,727,098

DRIVING MECHANISM FOR MAGNETIC RECORDER

Filed Oct. 26, 1954 3 Sheets-Sheet 2

Dec. 13, 1955 E. D. BRASSEUR 2,727,098

DRIVING MECHANISM FOR MAGNETIC RECORDER

Filed Oct. 26, 1954 3 Sheets-Sheet 3

United States Patent Office 2,727,098

Patented Dec. 13, 1955

2,727,098

DRIVING MECHANISM FOR MAGNETIC RECORDER

Eudore Desire Brasseur, Mont-sur-Marchinenne, Belgium, assignor to Ateliers de Constructions Electriques de Charleroi, Brussels, Belgium, a company of Belgium Application October 26, 1954, Serial No. 464,696

Claims priority, application France October 31, 1953

10 Claims. (Cl. 179—100.2)

The invention relates to drive mechanisms particularly for magnetic recorders.

In apparatus for recording on magnetic sheets, the magnetic recording, reproducing, and erasing heads, generally combined in a single unit, must be able to carry out different movements.

The present invention relates chiefly to a mechanism for the control of the movements of the magnetic heads of a recorder, recording on magnetic sheets along helical tracks. The invention is not limited to the actual mechanism of magnetic recorders but may be applied to any equipment requiring similar movements, that is, where a "guided" member moves in relation to an "explored" member along a helical track.

Such mechanism will control all the normal movements whereby the magnetic sheets are explored along a helical track. It will further make it possible to place the magnetic heads quickly at any point of the magnetic sheet. Moreover, this mechanism provides an easy means for repeating a small portion of the recording in order to check or correct the dictation.

The present invention has for its object the provision of improved and very simple drive mechanism for magnetic recorders which explore a magnetizable sheet along a helical track with provision for quickly setting the magnetic heads at any desired point on the track and for accurately back-spacing to repeat the scanning of any desired portion of the track.

The objects and advantages of the invention will be more fully understood from the following description and claims in conjunction with the accompanying drawings in which Figure 1 is a schematic end elevation showing by way of nonlimiting example drive mechanism in accordance with the present invention.

Figure 1:
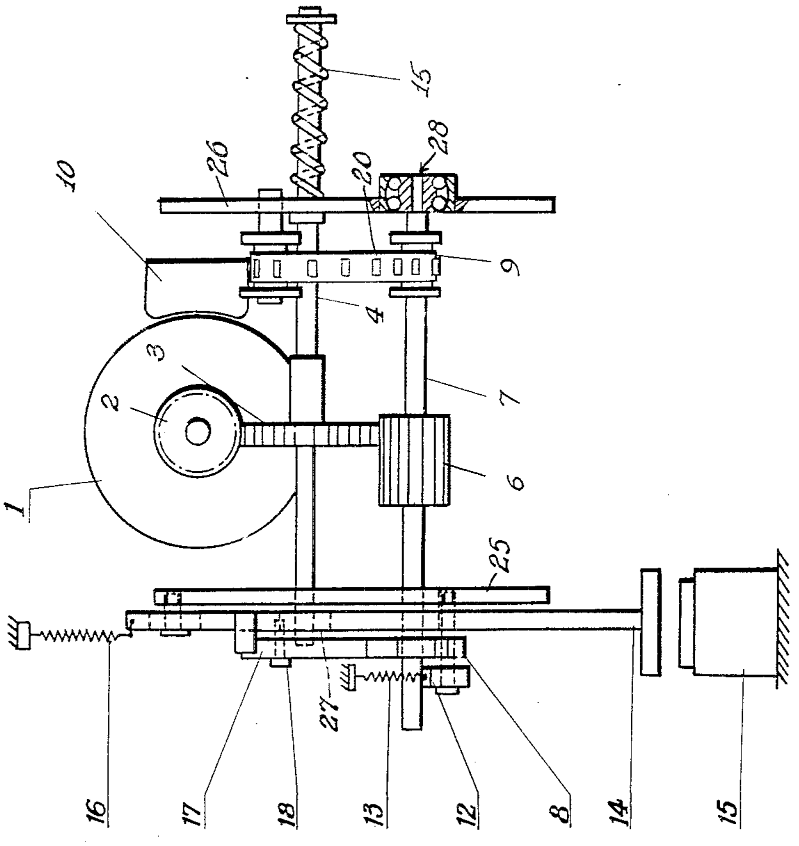

A recording drum 1 covered with a magnetizable sheet is rotatably supported and rotates continuously during the entire operation of the recorder. It drives a worm 2 at the same speed of rotation. The latter meshes with an intermediate gear wheel 3 fixed on an intermediate shaft 4. The intermediate shaft 4 is rotatably supported on frame members 25, 26 and can slide axially in its bearings being brought back to a normal position by a pressure spring 5. The normal position of the shaft 4 is adjustably determined by a collar 27. The intermediate gear wheel 3 also meshes with a driven gear wheel 6 having the same number of teeth and fixed on a drive shaft 7. The drive shaft 7 carries near one end a ratchet wheel 8 and near the other end a drive drum 9 intended for the drive of the magnetic heads 10, for example by means of a belt 20.

Each revolution of the recording drum 1 produces the advance by one tooth of the intermediate gear wheel 3 and the wheel 6. This movement is transmitted to the magnetic heads 10, by means of drive drum 9 through drive shaft 7. The exploration tracks of the magnetic heads 10 on the magnetic sheet mounted on the recording drum 1 are thus spaced by an interval corresponding to the advance by one tooth of the gear wheel 6 or the intermediate gear wheel 3.

On longitudinal displacement of the intermediate shaft 4 to the left (Fig. 1) against the pressure exerted by spring 5, the intermediate gear wheel 3 disengages from worm 2, but remains meshing with the gear wheel 6. In this position the drive drum 9 can be actuated by rotating the intermediate shaft 4 and maintaining the spring 5 compressed. In this way the magnetic heads 10 can be placed at any desired point along the recording drum 1. When spring 5 is released, the intermediate gear wheel 3 again meshes with worm 2 and readjusts by this movement the position of drive drum 9 so that the magnetic heads 10 are centered in relation to the exploration track.

The drive shaft 7 is supported to permit a small transverse movement thereof, as by a bearing block 28 hinged to the frame 26 on the end of the shaft carrying the drive drum 9. On the end of the shaft carrying the ratchet wheel 8, the drive shaft 7 is maintained in a slot 11 in the frame 25 and is resiliently held in a normal position by means of a lever 12 and of a spring 13 attached to the frame. A support 14 which is vertically slidable and is subject to the opposing action of an electromagnet 15 and of a spring 16 one end of which is fixed to the frame of the recorder, is vertically slideable and carries a pawl 17 swingable around a pivot 18 and brought back by a spring 19 to an abutment 21 located on the support 14.

Figure 4:
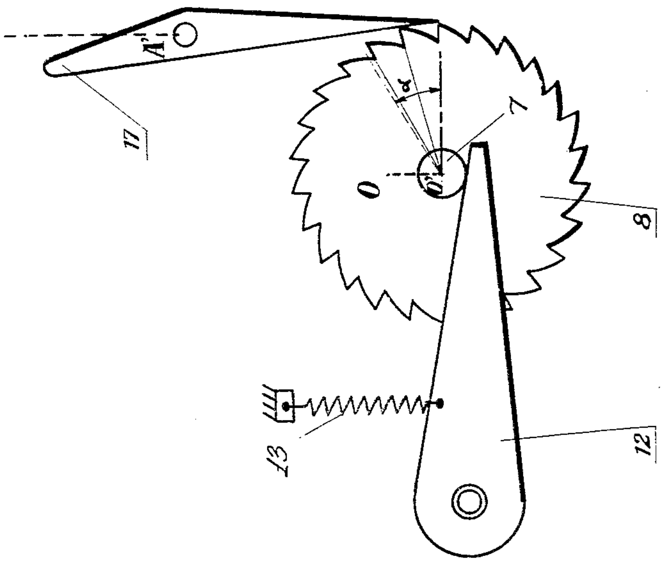
Figures 3 and 4 are schematic enlargements of a portion of Figure 2 illustrating the operation of the mechanism.
Figure 3:
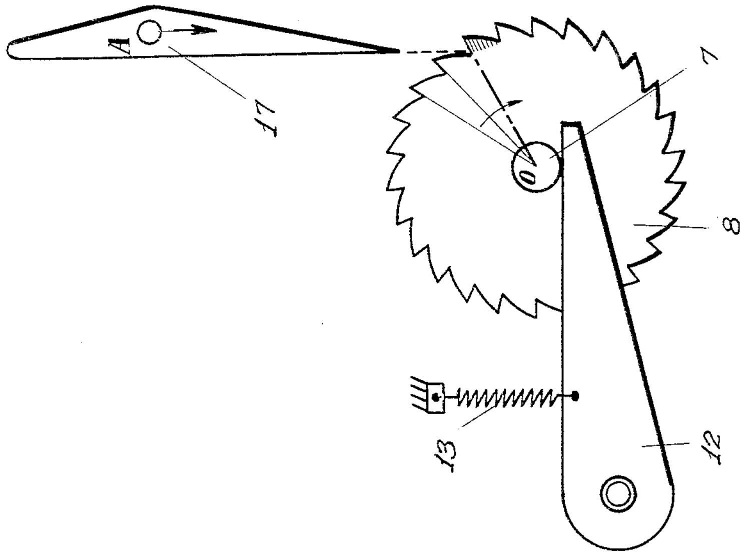

When the electromagnet 15 is energized for an instant, the support 14 moves downwardly against the action of spring 16. The pawl 17 held on support 14 by its pivot 18 follows this movement and is accordingly displaced in the direction AA' as shown in Figures 3 and 4. Pawl 17 engages the ratchet wheel 8, almost tangentially. The end of the drive shaft 7 is displaced in slot 11 from 0 to 0', that is, until the gear wheel 6 disengages from the intermediate gear wheel 3. As pawl 17 continues to press almost tangentially on ratchet wheel 8, the drive shaft 7 and hence the ratchet wheel 8 rotate by a predetermined angle to the moment when the pawl 17 rotating about its pivot 18 becomes tangentially to the ratchet wheel 8 and thus disengages itself therefrom.

Figure 2:
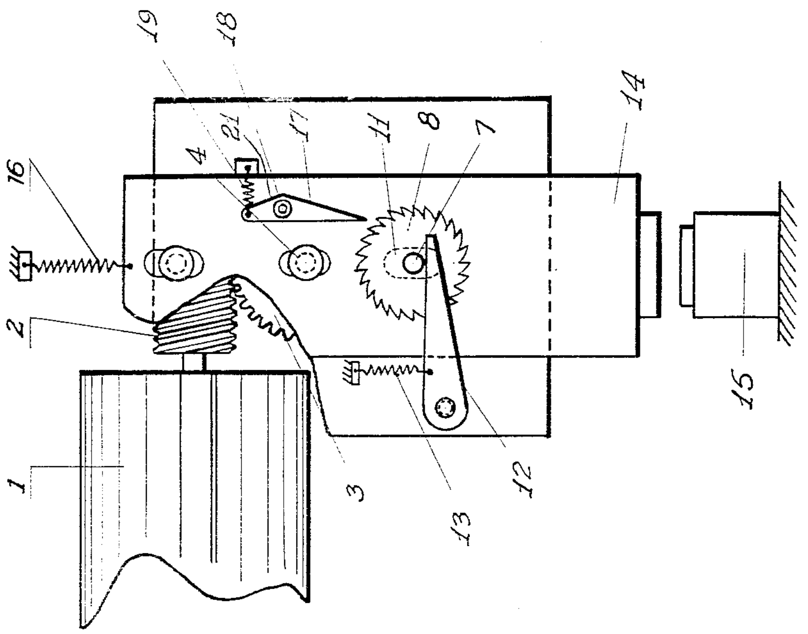
Figure 2 is a schematic side elevation of the mechanism.

The angle by which the ratchet wheel 8 and thereby the drive drum 9 are rotated is denoted $\alpha$ in Figure 2*b*. As soon as pawl 17 disengages from the ratchet wheel 8, the drive shaft 7 moves upwardly in groove 11 under the action of the lever 12 and spring 13, and the gear wheel 6 again meshes with the intermediate gear wheel 3, thus adjusting by its engagement the exact position of the magnetic heads 10 on the center of the magnetic track. All members are so disposed that this angular displacement $\alpha$ will occur in the opposite direction of the direction of normal rotation, thus causing a backward movement of the magnetic heads by a given number of tracks.

The eccentricity of the action of pawl 17 on the ratchet wheel 8 and the teeth thereof is preferably so chosen that the angular displacement of the drive shaft 7 measures an arc approximately equivalent to one tooth of the gear wheel 6.

When the electromagnet 15 is deenergized, the support 14 moves up under the action of spring 16, and pawl 17, which is no longer in engagement with the ratchet wheel 8, resumes its initial position under the action of spring 19.

As has been explained above, the back-spacing by one tooth of the gear wheel 6 causes a displacement of the magnetic heads 10 by the width of the interval between two exploration tracks. It is thus possible to make the magnetic heads 10 move back by the width of one exploration track in order to correct or check the recording or the reproduction during scanning, by an instantaneous actuation of the electromagnet 15.

With the described mechanism according to the invention the movements of a guided member in relation to a scanned, machined, or inspected member along a helical track can be controlled. The parts required for the mechanism are very simple and small, so that this control can be carried out in a limited space and at low cost.

What I claim and desire to secure by Letters Patent is:

1. A drive mechanism for a magnetic recorder having a magnetic head for scanning a magnetizable sheet on a rotating drum fixed to a shaft; comprising a worm fixed to said shaft, a second shaft, an intermediate gear wheel fixed to said second shaft, and meshed with said worm, a drive shaft, a driven gear wheel fixed to said drive shaft and engaging said intermediate gear wheel, a drive member fixed to said drive shaft, means connected to said drive member for moving the magnetic head, means for mounting said drive shaft so as to enable movement thereof transversely to its axis and normally positioning the drive shaft so that the driven gear and intermediate gear are meshed, and means for moving the drive shaft transversely to disengage the driven gear from the intermediate gear and simultaneously rotating the drive shaft in a direction opposite to its normal rotation.

2. A drive mechanism according to claim 1 wherein said last means rotates the drive shaft through a predetermined small arc corresponding to a given integral member of teeth of the driven gear wheel.

3. A drive mechanism according to claim 2 including means for moving said second shaft longitudinally to disengage the intermediate gear wheel from the worm while maintaining it engaged with the driven gear, and means for turning the second shaft manually, whereby the drum and the magnetic head are moveable independently.

4. A drive mechanism according to claim 2 wherein the last named means includes a ratchet wheel fixed to the drive shaft, a pawl positioned so as to engage the ratchet wheel nearly tangentially, and means for moving the pawl so that it is positioned tangentially to the ratchet wheel and thereby disengaged from the ratchet wheel after the pawl has turned the ratchet wheel through a predetermined arc.

5. A drive mechanism according to claim 4 wherein the means for moving the pawl includes an electromagnet mechanically connected to the pawl.

6. In a machine having a guided member for scanning a rotating drum along a fixed helical path thereof, the drum being fixed to a rotating shaft; a drive mechanism comprising a worm fixed to the shaft, a second shaft, an intermediate gear wheel fixed to the second shaft and meshed with the worm, a drive shaft, a driven gear wheel fixed to the drive shaft, a drive member fixed to the drive shaft, means connected to said drive member for moving the guided member, means for mounting the drive shaft so as to enable movement thereof transversely to its axis and normally positioning the drive shaft so that the driven gear and the intermediate gear are in mesh, and means for moving the drive shaft transversely to disengage the driven gear wheel from the intermediate gear wheel and simultaneously rotating the drive shaft in a direction opposite to its normal rotation.

7. A drive mechanism according to claim 6, wherein said last means rotates the drive shaft through a predetermined small arc corresponding to an integral number of teeth of the driven gear wheel.

8. A drive mechanism according to claim 7 including means for moving said second shaft in one direction longitudinally to disengage the intermediate gear wheel from the worm while maintaining it engaged with the driven gear wheel, means for turning the second shaft manually, means for moving the second shaft longitudinally in the opposite direction and simultaneously aligning the guided member with the helical path.

9. A drive mechanism according to claim 7 wherein the last named means includes a ratchet wheel fixed to the drive shaft, a pawl positioned so as to engage the ratchet wheel nearly tangentially, and means for moving the pawl so that it is positioned tangentially to the ratchet wheel and thereby disengaged from the ratchet wheel after the pawl has turned the ratchet wheel through a predetermined arc.

10. A drive mechanism according to claim 9 wherein the means for moving the pawl includes an electromagnet mechanically connected to the pawl.

No references cited.